3,084,421
REINFORCED METALLIC COMPOSITES
David L. McDanels and Robert W. Jech, Cleveland, John W. Weeton, Rocky River, and Donald W. Petrasek, Cleveland, Ohio, assignors to the United States of America as represented by the Administrator of the National Aeronautics and Space Administration
No Drawing. Filed Oct. 21, 1960, Ser. No. 64,224
4 Claims. (Cl. 29—183.5)
(Granted under Title 35, U.S. Code (1952), sec. 266)

The invention described herein may be manufactured and used by or for the Government of the United States of America for governmental purposes without the payment of any royalties thereon or therefor.

This invention concerns reinforced metallic composites and a method of making the same. More particularly, the invention relates to reinforced metallic composites utilizing discontinuous fiber reinforcements.

Prior art in the field of metal reinforced metallic composites has been work in which titanium and its alloys are reinforced with molybdenum wire and a composite made using powder metallurgy technique and severe mechanical working. The major disadvantage of this is the necessity of mechanical working of the composite in order to achieve the desired tensile strength, low degree of porosity, and fiber orientation.

The disadvantages of the prior art materials were substantially overcome by the invention disclosed in co-pending application Serial No. 64,226, filed October 21, 1960, in which fibers having a diameter of less than 0.01 inch and a length equal to the full length of the specimen were used to reinforce matrix material. The fibers used in the invention of the co-pending application are never worked in the course of preparing the reinforced materials, thus eliminating the extreme working necessary to prepare similar reinforced articles disclosed in prior art methods.

The object of this invention is to provide high strength and high strength-density ratio, high ductility, and low notch sensitivity materials for application at cryogenic and elevated temperatures.

A further object of the invention is to provide a material having a high modulus of elasticity and modulus-to-density ratio over a wide range of temperatures.

An additional object of this invention is to provide a fiber reinforced metallic composite wherein no working of the composite is necessary to utilize the strength of properties desired of the fiber.

Still another object of the invention is to provide a fiber reinforced metallic composite which maintains the original size, shape, and orientation of the fibers.

Still a further object of the invention is to provide a highly reinforced metallic composite which may utilize brittle fibers or whiskers since no working of the fiber is involved in the fabrication of the composite.

The present invention consists of a composite material composed of many high strength fibers such as tungsten fibers surrounded by and dispersed in a lower strength more ductile matrix or binder of the material such as copper. The fibers have the diameter of less than 0.010 inch and can be of any particular length which is less than that of the specimen. In other words, none of the fibers extend the full length of the particular article.

The method of fabrication of the composite consists of packing the short length fibers in close proximity to each other such that their longitudinal axes are parallel to each other. Fibers are held in position by forcing them into a ceramic tube or in a circular mold. The articles are then heated in a protected atmosphere and molten matrix is infiltrated through the fibers.

It is observed that the discontinuous fibers exhibit the same strength as that of the full-length fiber composite disclosed in the co-pending application Serial No. 64,226 filed October 21, 1960. This result is quite unexpected as it is not obvious that for the same volume percent of fiber content the short length fibers would produce tensile strengthening equivalent to the full length fibers. The high strength of the composite is apparently obtained by a strong bond in shear between the fiber and the matrix and this bond permits each constituent in the composite to carry a load proportional to its strength in volume percentage. Thus, whether or not the fibers are oriented, they transfer their share of strength to the composite in whatever orientation they exist.

The advantages of the short length fiber, as compared to the full length fiber reinforced composite disclosed in the aforementioned co-pending application, is that the composites utilizing the short length fibers are easier and faster to produce. Additionally, the short length fiber may actually be whiskers which are known to have unusually high strength properties, as compared to even normal fiber strengths.

Another advantage is that fibers of geometries other than round could be utilized to achieve closer packing, and even triaxial strengthening of the matrix may be obtained by the use of short length fibers or whiskers. Positioning of the discontinuous fibers or whiskers is particularly easy for all diameters and may be accomplished by mechanical or electrical magnetic means.

It is believed that the invention will be better understood from the following detailed example. Cut lengths of 5 mil tungsten wire were cleaned with sodium peroxide and ammonium hydroxide and loaded into an Alundum tube. The cut wires or fibers were from $\frac{1}{8}$ to $\frac{5}{8}$ inch in length with the majority of the fiber approximately $\frac{3}{8}$ of an inch long. The size of the diameter of a tube was small in comparison to the fiber length so that the fibers packed in such a manner that the long axis were oriented parallel to the long axis of the specimen. The fibers in the Alundum tube were vibrated to facilitate orientation. This Alundum tube was then placed in a closed end quartz tube having a slug of copper infiltrant at the top thereof. The entire assembly was heated to 2200° F. and held for one hour at this temperature. Top feed infiltration caused the spaces between the discontinuous fibers to fill with the molten copper. The specimens were kept under a vacuum during infiltration to prevent oxidation of the tungsten and thereby provide a clean wire surface. This is essential since it is found that any surface contamination on the wire greatly reduces the chance of producing successful infiltration. However, hydrogen or inert atmospheres could be used rather than the vacuum. The composite is finally cooled and removed from the tubes.

The following is a table showing the properties of several specimens made using the foregoing procedure. The specimens shown in the table vary in length from 1½ to 3 inches and utilized 5 mil tungsten fibers of approximately $\frac{3}{8}$ of an inch in length.

| | Vol. percent Cu | Vol. percent W | Dia. (in.) | Area (in.$^2 \times 10^{-3}$) | Break Load (lbs.) | Ultimate Tensile Strength (p.s.i.) |
|---|---|---|---|---|---|---|
| 1 | 62.34 | 37.66 | 0.118 | 10.93 | 1,022 | 93,500 |
| 2 | 64.3 | 35.7 | 0.101 | 8.011 | 965 | 120,000 |
| 3 | 67.07 | 32.3 | 0.101 | 8.011 | 885 | 110,000 |
| 4 | 81.85 | 18.15 | 0.126 | 12.46 | 780 | 62,600 |
| 5 | 85.62 | 14.38 | 0.135 | 14.31 | 810 | 56,600 |
| 6 | 85.9 | 14.1 | 0.1426 | 16.0 | 920 | 57,300 |
| 7 | 87.61 | 12.38 | 0.1428 | 16.0 | 660 | 41,100 |
| 8 [1] | 59.8 | 40.2 | 0.092 | 6.78 | 930 | 137,000 |
| 9 [1] | 87.4 | 12.6 | 0.097 | 7.46 | 356 | 47,700 |
| 10 | 100 | 0 | 0.1015 | 8.09 | 214.5 | 26,500 |

[1] These specimens utilized 5 mil tungsten fibers which extended the full length of the specimen of the type disclosed in co-pending application, Serial No. 64,226, filed October 21, 1960.

As can be seen from the table, the discontinuous fiber specimens evidenced exceedingly high tensile strengths and break loads essentially equivalent to the full length fiber composites Nos. 8 and 9. A non-reinforced copper specimen is shown in No. 10 to clearly point up the great improvement in properties due to the fiber reinforcing.

Though the above table discloses specimens having only up to 37.66% tungsten, by no means is this the upper limit of the amount of reinforcement that may be used. As can be seen, the increase in tungsten proportionately increases the ultimate tensile strength of the product and this would continue as the volume percent of tungsten increases in a given specimen.

In addition to the metal fibers herein disclosed, materials other than metals may be used. Such materials include ceramic fibers and fibers of refractory hard metals or whiskers of both of these type of materials.

Additionally, methods such as electroplating, vacuum deposition, and dipping may be used to position the binder or matrix in which event the properties of the composite would not be subject to change due to thermal treatment.

Obviously, many modifications and variations of the present invention are possible in the light of the above teachings. It is, therefore, to be understood that within the scope of the appended claims the invention may be practiced other than as specifically described.

What is claimed is:

1. In a method for making a reinforced metal composite structure having a predetermined length, the steps of cutting fibers of reinforcing metal into lengths substantially less than said predetermined length of said structure, orienting said cut fibers into parallel relationship and flowing a metallic matrix into the space between said fibers.

2. In a method for making an elongated composite structure, the steps of cutting fibers of a reinforcing metal having a high tensile strength into lengths substantially less than the major dimension of said elongated structure, orienting said cut fibers into parallel relationship, packing said oriented fibers into close proximity with each other, and infiltrating a molten matrix of a metal having a tensile strength less than said reinforcing metal through said fibers.

3. In an elongated composite structure having a length greater than one and one-half inches of the type comprising a metallic matrix containing a reinforcing metal having a tensile strength greater than that of said matrix; the improvement comprising a plurality of discontinuous fibers of said reinforcing metal dispersed within said matrix with their longitudinal axes substantially parallel to the longitudinal axis of said structure, each of said fibers having a diameter less than about 0.010 inch and a length within the range from about ⅛ to about ⅝ inch.

4. In a method of making a reinforced metal composite structure having a predetermined length, the steps of cleaning fibers of reinforcing metal having lengths substantially less than said predetermined length of said structure, orienting said cleaned fibers into parallel relationship with the longitudinal axes thereof oriented parallel to the longitudinal axis of the composite structure, and flowing a metallic matrix into the space between said fibers.

References Cited in the file of this patent

UNITED STATES PATENTS

| | | |
|---|---|---|
| 2,876,097 | Fisher | Mar. 3, 1959 |
| 2,903,787 | Brennan | Sept. 15, 1959 |
| 2,953,849 | Morgan | Sept. 27, 1960 |
| 2,983,996 | Neely | May 16, 1961 |

FOREIGN PATENTS

| | | |
|---|---|---|
| 733,061 | Great Britain | July 6, 1955 |
| 821,690 | Great Britain | Oct. 14, 1959 |
| 836,749 | Great Britain | June 9, 1960 |
| 345,461 | Switzerland | May 13, 1960 |

OTHER REFERENCES

"Metal Fiber Composites," Product Engineering, May 30, 1960, pages 57–61.

"Fiber Metals," by A. G. Metcalfe, published Materials and Method (M 59), November 1955, pages 96–98.

Notice of Adverse Decision in Interference

In Interference No. 94,675 involving Patent No. 3,084,421, D. L. McDanels, R. W. Jech, J. W. Weeton and D. W. Petrasek, REINFORCED METALLIC COMPOSITES, final judgment adverse to the patentees was rendered July 21, 1966, as to claim 3.

[*Official Gazette September 6, 1966.*]